United States Patent
O'Keeffe (10) Patent No.: US 9,386,347 B1
(45) Date of Patent: Jul. 5, 2016

(54) BURST EFFICIENT FAST PROGRAM ACQUISITION

(75) Inventor: Francis J. O'Keeffe, Glounthaune (IE)

(73) Assignee: ARRIS Enterprises, Inc., Suwanee, GA (US)

(*) Notice: Subject to any disclaimer, the term of this patent is extended or adjusted under 35 U.S.C. 154(b) by 120 days.

(21) Appl. No.: 13/163,784

(22) Filed: Jun. 20, 2011

(51) Int. Cl.
*H04N 7/173* (2011.01)
*H04N 21/4385* (2011.01)
*H04N 21/658* (2011.01)

(52) U.S. Cl.
CPC ....... *H04N 21/4385* (2013.01); *H04N 21/6581* (2013.01)

(58) Field of Classification Search
CPC .............. H04N 19/00054; H04N 21/2389; H04N 21/4384; H04N 21/4385; H04N 21/64322; H04N 21/64784; H04N 21/6581; H04N 7/163
USPC .............................. 725/90, 94–96; 375/240.15
See application file for complete search history.

(56) References Cited

U.S. PATENT DOCUMENTS

| | | | | |
|---|---|---|---|---|
| 7,711,048 B2 * | 5/2010 | Brooks et al. | ............ | 375/240.15 |
| 8,254,449 B2 * | 8/2012 | Bing et al. | ............... | 375/240.12 |
| 2002/0067768 A1 * | 6/2002 | Hurst | ........................ | 375/240.03 |
| 2003/0053792 A1 * | 3/2003 | Janevski | ......................... | 386/46 |
| 2006/0245444 A1 * | 11/2006 | Sharpe | ............................. | 370/412 |
| 2007/0121629 A1 * | 5/2007 | Cuijpers et al. | ............... | 370/390 |
| 2010/0054333 A1 * | 3/2010 | Bing et al. | ............... | 375/240.12 |

OTHER PUBLICATIONS

U.S. Appl. No. 13/155,443 entitled "Group of Pictures Size Adjustment" filed Jun. 8, 2011, with first named inventor, Ansley, Carol J.

* cited by examiner

*Primary Examiner* — Pankaj Kumar
*Assistant Examiner* — Alazar Tilahun
(74) *Attorney, Agent, or Firm* — Stewart M. Wiener (57) ABSTRACT

Various methods, systems, and apparatuses can be used to perform burst efficient fast program acquisition. In some implementations, a burst efficient fast program acquisition system can operate to remove unused B-frame thereby reducing the bandwidth required for a fast burst. In other implementations, the burst efficient fast program acquisition system can decode the fast burst, identify the video frames needed for reassembly, and encode a truncated group of frames for fast burst transmission. A burst efficient fast program acquisition system can also use pre-calculated streamlined burst fast burst in conjunction with program prediction methods such as adjacent program and frequently viewed program thereby further reducing the latency associated with IPTV program acquisitions.

22 Claims, 8 Drawing Sheets

BURST EFFICIENT FAST PROGRAM ACQUISITION

TECHNICAL FIELD

This disclosure relates to improving program acquisitions in internet protocol-based television (IPTV).

BACKGROUND

Internet protocol (IP) is increasingly used to transmit television signals via packet-based standards. A general term used for all packet-based television is called Internet protocol television (IPTV). Packet-based protocols have traditionally exhibited benefits and drawbacks when compared to traditional broadcast television. One of the primary drawbacks to IPTV is the latency when a subscriber switches programs rapidly. IPTV program acquisitions require a number of steps before the video image is displayed to the subscriber. An IPTV program is typically sent to subscribers via a multicast data transmission and thus the subscriber must leave a current multicast group and join a new group to access a different program. In addition, the time associated with processing video frames further increases cumulative latency of switching from one program to another.

Typically, when a subscriber changes programs during the middle of a group of pictures-based (GOP) multicast transmission, the subscriber needs to wait until the beginning of the next GOP and/or I-frame before being able to view the video image. Video images transmitted in a GOP are a continuous cross-referenced set that require certain GOP frames to display any picture. One suggested method to eliminate this limitation is to send a fast burst of data to the subscriber immediately upon receiving the program acquisition request. The fast burst can contain the video frames contained in the GOP prior to the join point thereby allowing the subscriber to view the video when joining the multicast stream mid-GOP. However, the bandwidth requirements for implementing fast burst can stress network resources without a mechanism to increase the efficiency of fast bursts.

BRIEF DESCRIPTION OF THE DRAWINGS

Like reference numbers and designations in the various drawings indicate like elements.

DETAILED DESCRIPTION

In many IPTV video systems, the ability to transition seamlessly between different programs remains a challenge. Subscribers are accustomed to fast transitions between programs that occur when viewing traditional broadcast television. Typically, when a subscriber joins a new an IPTV program, the terminating system receives the command and subsequently joins the subscriber to the requested multicast/broadcast program. When the subscriber joins during the transmission of a moving picture expert group (MPEG) group of pictures (GOP), the terminating system can take a number of actions to ensure the subscriber immediately views the requested program instead of waiting until the beginning of the next GOP. One such method is a "fast burst," whereby the terminating system sends a high priority burst of frames to the subscriber immediately upon the program acquisition. This fast burst allows the user to effectively process subsequent multicast/broadcast video frames immediately without picture loss, degradation, or wait time for the next GOP. However, fast bursts can be bandwidth intensive if subscribers frequently change programs.

Thus, in some implementations of this disclosure, systems and methods can operate to perform burst efficient fast program acquisition. In some implementations, a burst efficient fast program acquisition system can operate to remove unused B-frames thereby reducing the bandwidth required for a fast burst. For example, unneeded and/or expired B-frames can be removed from the fast burst without limiting the ability of the subscriber device to properly process the current GOP frame. In some implementations, the removed B-frames can be replaced with blank or trivial frames to maintain effective processing by the subscriber device.

Systems and methods can also operate to perform burst efficient fast program acquisition with truncation and recoding of fast burst frames. In some implementations, the burst efficient fast program acquisition system can decode the fast burst, identify the video frames needed for reassembly, and re-encode an anchor frame (e.g., I-frame or P-frame) or truncate a group of frames for fast burst transmission. In additional implementations, the burst efficient fast program acquisition system can also further reduce needed bandwidth by reducing the frame resolution during the encoding process.

In some implementations, systems and methods can also operate to perform burst efficient fast program acquisition prediction in conjunction with burst streamlining techniques. In some implementations, the burst efficient fast program acquisition system can pre-calculate a streamlined fast burst for adjacent programs. In other implementations, the burst efficient fast program acquisition system can pre-calculate a streamlined fast burst for frequently viewed programs. Anticipating subscriber program changes and pre-calculating burst streamlined fast bursts can reduce latency and bandwidth requirements, thereby preserving network resources and improving the subscriber experience.

Figure 1:
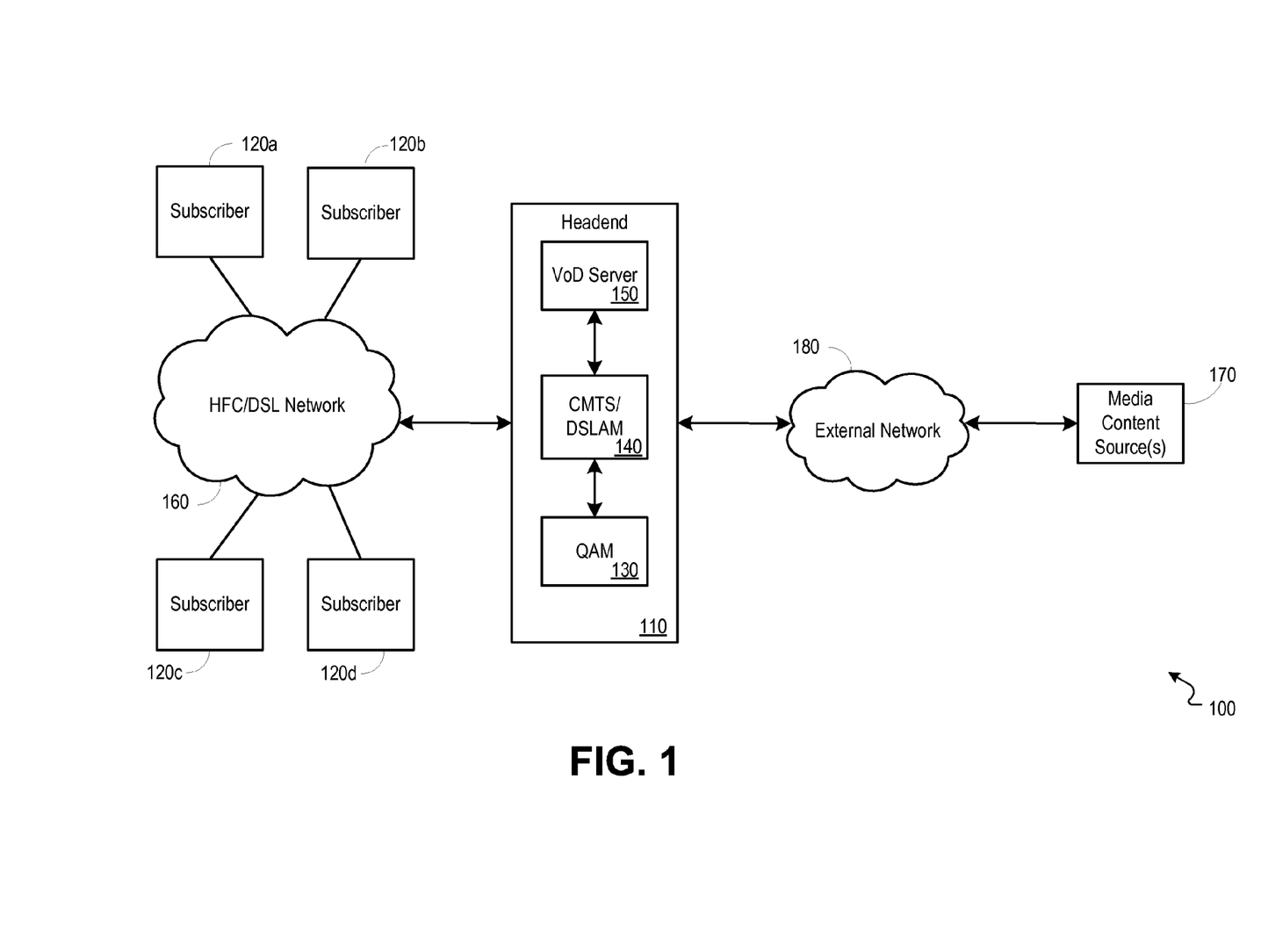
FIG. 1 is a block diagram illustrating an example network environment operable to provide burst efficient fast program acquisition.

FIG. 1 is a block diagram illustrating an example network environment operable to provide burst efficient fast program acquisition. In some implementations, a burst efficient fast program acquisition system such as, for example, a headend 110 can provide video, data and/or voice service(s) to one or more subscribers 120*a-d* (e.g., cable modem(s), set-top box(es), and/or digital subscriber line (DSL) modem). The headend 110 can include devices such as, for example, an edge quadrature amplitude modulation (QAM) device 130 and a cable modem termination system (CMTS) 140. The CMTS 140 can be a CMTS or a modular CMTS (M-CMTS). In alternative implementations, the headend can be a digital subscriber line access multiplexer (DSLAM) and a DSL modem can be located at the subscriber 120a-d. In other implementations, video streams can be received by the CMTS 140 from a video on demand (VOD) server 150. Video data can be distributed to subscribers 120a-d via an HFC/DSL network 160. In still further implementations, the video data can be distributed to subscribers 120a-d via a DSL network 160 using various layers of fiber such as, for example, EPOC or EPON.

Video streams can be received from a media content source(s) 170 via an external network(s) 180 (e.g., including an IP network). In some implementations, these video streams can enter the system as raw moving picture experts group (MPEG) streams, or any other streaming video protocol supported by the headend 110 and/or EQAM device 130. The VOD server 150 can receive requests for video service via the CMTS 140, and provide the requested video to the CMTS 140 and/or subscribers 120a-d. The CMTS 140 can address multicast/broadcast program feeds to one or more subscribers 120a-d and forward the addressed video to the QAM 130 for modulation onto a carrier signal.

Data services can be handled by the headend 110 through a CMTS 140. The CMTS 140 can receive data signals from subscribers 120a-d and media content source(s) 170 through an external network(s) 180 (e.g., including the Internet). The network(s) 180, for example, can operate using Internet protocol (IP), sending data packets to and receiving data packets from the headend 110. When a subscriber 120a-d changes programs, the headend 110 receives the signal and can subsequently discontinue the current program and directs the subscriber 120a-d to a specific multicast/broadcast program.

If the join occurs on a group of pictures (GOP) boundary, then no specific fast burst action needs to be taken. The subscriber 120a-d will receive the next I-frame and therefore have the necessary frames to properly reassemble the streaming multicast video signal. If the join occurs in the middle of a GOP transmission, the current GOP frames cannot be interpreted accurately by the subscriber 120a-d without information from frames earlier in the GOP prior to join point. To mitigate this issue, the headend 110 can send a fast burst, which comprises video frames from the current GOP prior to the join point, to the subscriber 120a-d thereby enabling the subscriber 120a-d to properly process incoming multicast/broadcast video signals of the current GOP from the join point. The subscriber 120a-d can then proceed with normal viewing of the multicast/broadcast program until another program acquisition is requested.

Figure 2:
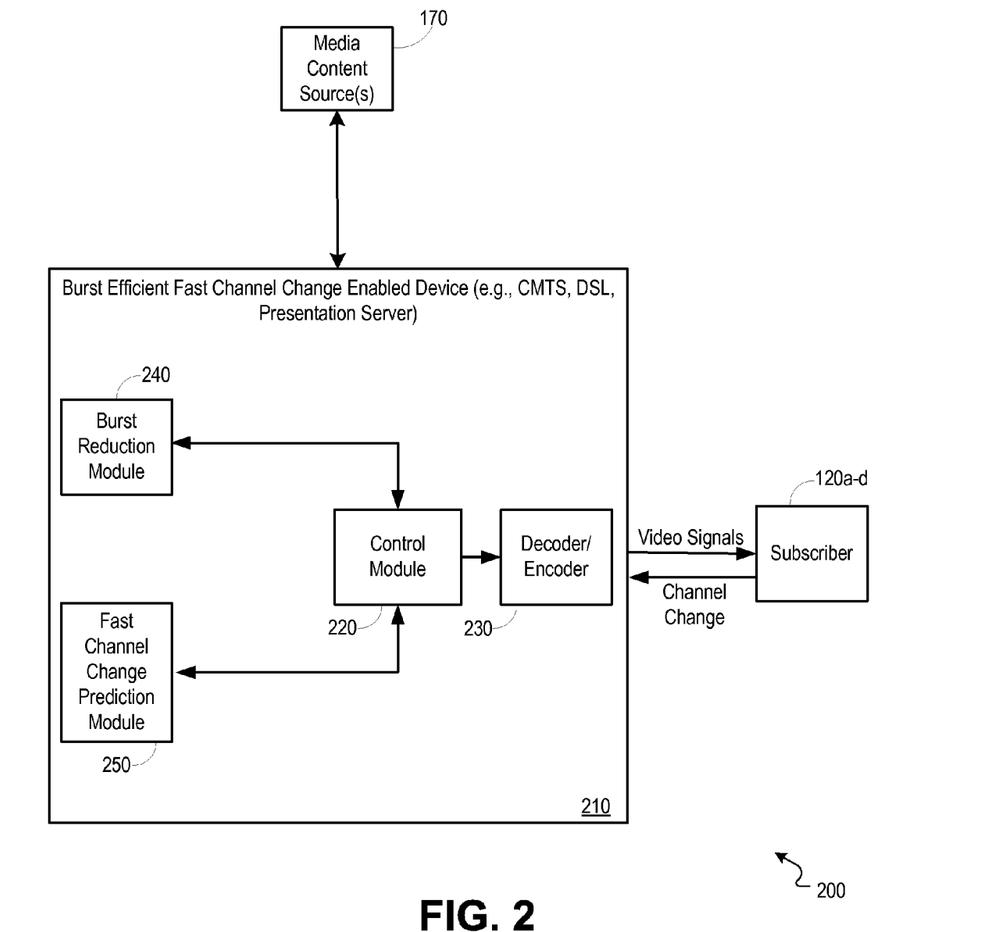
FIG. 2 is a block diagram illustrating an example flow for a digital video delivery system operable to provide burst efficient fast program acquisition.

FIG. 2 is a block diagram illustrating an example flow for a digital video delivery system operable to provide burst efficient fast program acquisition. In some implementations, a burst efficient fast program acquisition system 210 (e.g., headend 110 of FIG. 1) can include a control module 220 (e.g., a processor), a decoder/encoder 230, a burst reduction module 240, and a fast program selection prediction module 250. In some implementations, the control module 220 can receive program acquisition requests from subscribers 120a-d and subsequently direct the subscriber 120a-d to a multicast/broadcast stream of the video program. The burst efficient fast program acquisition system 210 can receive the video content from multiple media content source(s) 170.

In some implementations, when a subscriber 120a-d initiates a program acquisition, a signal is received by the control module 220 and subsequently processed to direct the subscriber 120a-d to a multicast/broadcast program. The join can occur using a protocol such as, for example, an IGMP join command. In some implementations, the burst efficient fast program acquisition system 210 can be operable to also join a program from multiple media content source(s) 170. The burst efficient fast program acquisition system 210 can then stream the video data to the subscriber 120a-d. The subscriber 120a-d location can include equipment such as, for example, a set-top box (STB) or other customer premise equipment (CPE) device to process and display the video.

In those implementations when B-frame burst efficient is enabled, the burst efficient fast program acquisition system 210 can send a streamlined fast burst to reduce program acquisition latency when a program acquisition request occurs on a non-I-frame GOP boundary (e.g., in the middle of a GOP transmission). A fast burst can send one or more unicast frames to enable the subscriber 120a-d equipment to process the remaining section of the multicast/broadcast GOP. The streamlined fast burst can be accomplished by the burst efficient fast program acquisition system 210 with the burst reduction module 240 and/or fast program selection prediction module 250 in conjunction with processing (e.g., control module 220) and storage modules.

In some implementations, the burst reduction module 240 can remove unneeded or expired B-frames from the fast burst prior to transmission. In another implementation, the burst reduction module 240 can decode and encode the fast burst frames to remove unneeded frames. In still further implementations, the burst reduction module can transrate or recode the fast burst at a lower resolution. It should be understood that the burst reduction module 240 can perform one or more of these operations in parallel and/or conjunction with other burst streamlining methods.

In some implementations, the fast program selection prediction module 250 can pre-calculate burst streamlining for fast burst based on program acquisition predictive methods. For example, the fast program selection prediction module 250 can pre-calculate and store streamlined fast burst for programs that are close to the subscriber's current program. In some implementations, close to can refer to a program adjacent in program number. In other implementations, close to can refer to a program adjacent to an electronic program guide (EPG). In another example, the fast program selection prediction module 250 can pre-calculate and store streamlined fast burst streams for programs that are frequently visited by a subscriber.

Figure 3:
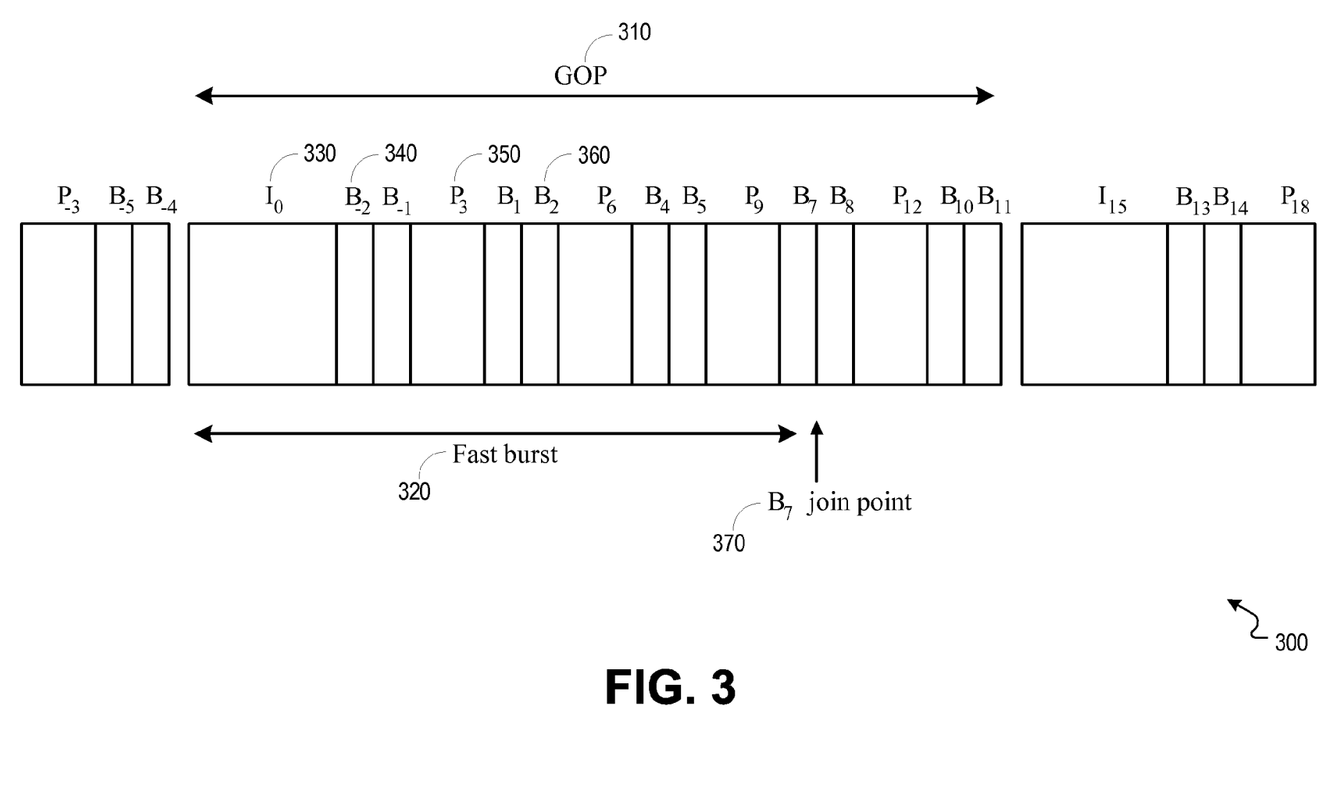
FIG. 3 is a block diagram illustrating an example fast burst GOP diagram operable to provide burst efficient fast program acquisition.

FIG. 3 is a block diagram illustrating an example fast burst GOP diagram operable to provide burst efficient fast program acquisition. The group of pictures (GOP) 310 can span a number of frames comprising MPEG I-frames, P-frames, and B-frames. The fast burst 320 can consist of GOP 310 frames prior to a subscriber join and reside in data storage or cache in the burst efficient fast program acquisition system (e.g., headend 110 of FIG. 1 and burst efficient fast program acquisition system 210 of FIG. 2). The join can be a standardized join format such as, for example, an IGMP join. The frames that comprise the fast burst 320 can include but are not limited to I-frame $I_0$ 330, B-frame $B_{-2}$ 340, P-frame $P_3$ 350, and B-frame $B_2$ 360.

In one example, the subscriber might join at frame $B_7$ 370. It should be noted that a subscriber (e.g., subscriber 120a-d in FIG. 1 and FIG. 2) can join prior to, during, or after the transmission of any GOP 310. However, when a subscriber joins a program during the transmission of a GOP 310, the burst efficient fast program acquisition system can send a fast burst 320 to the subscriber thereby enabling the subscriber to reconstruct video following the join point 370.

In some implementations, the IGMP join 370 can occur with burst with B-frame burst efficient fast program acquisition. In those implementations that perform B-frame burst streamlining, the burst efficient fast program acquisition system (e.g., burst efficient fast program acquisition system 210 of FIG. 2) can remove or simplify B-frames such as, for example, all B-frames from $B_{-2}$ 340 up to $B_5$ that are before the join point because B-frames prior to the IGMP join 370 are not used in the reconstruction of the video image following the IGMP join 370. Unneeded B-frames can be removed without replacement and/or with replacement with blank or trivial B-frames. Blank or trivial B-frames can reduce potential incompatibility decoding frames at the subscriber. In should be understood that removal of B-frames can occur independently or in conjunction with other burst streamlining methods.

In still further implementations, B-frame streamlined fast bursts can be used in conjunction with program selection prediction methods. For example, B-frame streamlined fast bursts can be pre-calculated and stored for programs that are related to the subscriber's current program in some way. In some implementations, related to can refer to a program with characteristics similar to the subscriber's current program. In other implementations, related to can refer to a program in the same category as the subscriber's current program. In another example, B-frame streamlined fast bursts can be pre-calculated and stored for programs that are frequently visited by a subscriber.

Figure 4:
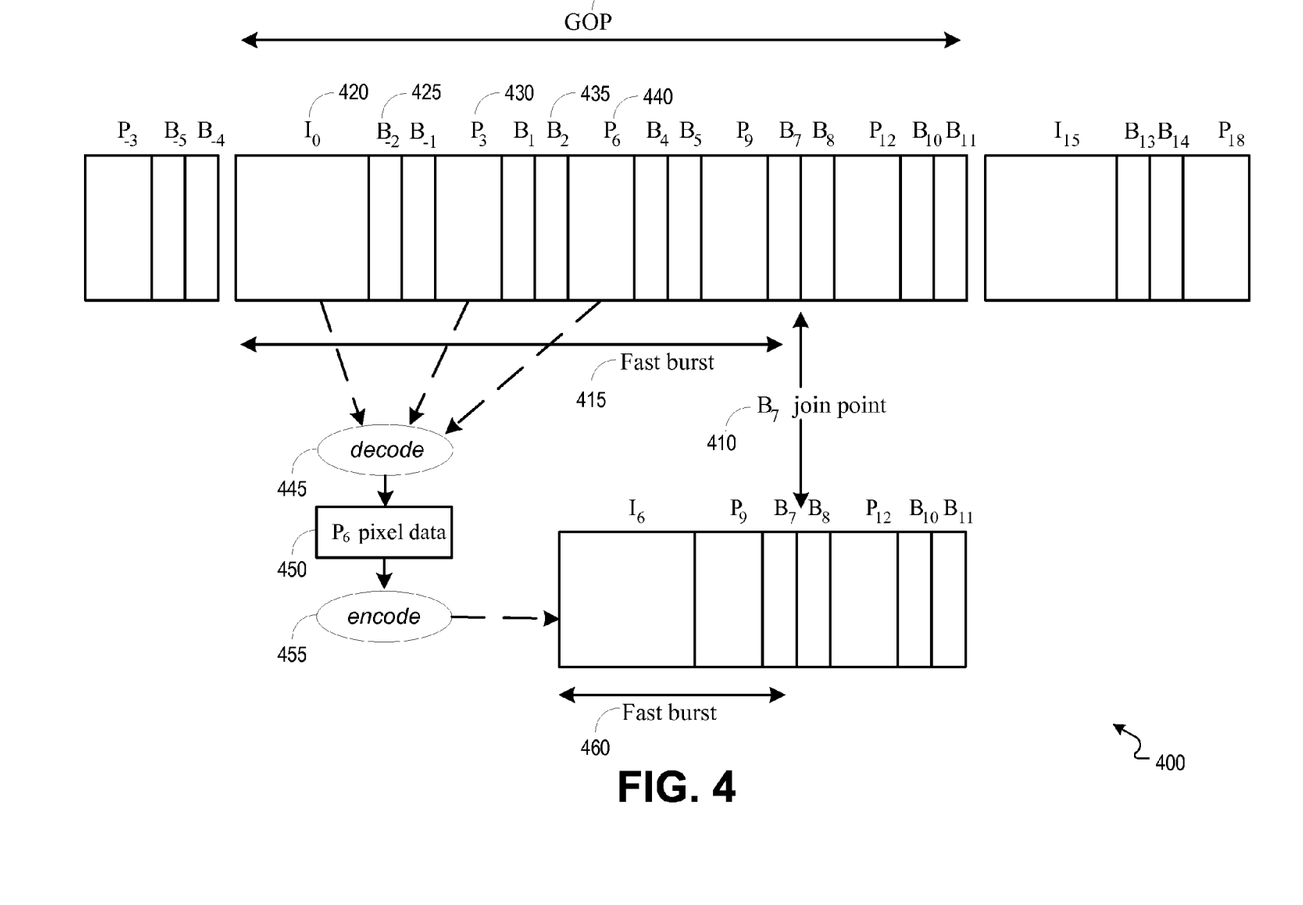
FIG. 4 is a block diagram illustrating an example fast burst GOP diagram operable to provide a truncated and recoded burst efficient fast program acquisition.

FIG. 4 is a block diagram illustrating an example fast burst GOP diagram operable to provide a truncated and recoded burst efficient fast program acquisition. The group of pictures (GOP) 405 can span a number of frames comprising I-frames, P-frames, and B-frames. Following an attempt to join at frame $B_7$ 410, the burst efficient fast program acquisition system can generate a fast burst 415 including GOP 405 frames prior to a subscriber join 410. The join 410 can be a standardized join format such as, for example, an IGMP join 410. The frames that comprise the fast burst 415 can include but is not limited to I-frame $I_0$ 420, B-frame $B_{-2}$ 425, P-frame $P_3$ 430, in-GOP B-frame $B_2$ 435, and P-frame $P_6$ 440.

As in the previous example, a subscriber (e.g., subscriber 120a-d in FIG. 1 and FIG. 2) can join prior to, during, or after the transmission of any GOP 405. In one example, the subscriber might join at frame $B_7$ 410. In some implementations, the IGMP join 410 can occur with recoded burst efficient fast program acquisition. In those implementations that perform recoded burst streamlining, the burst efficient fast program acquisition system (e.g., headend 110 of FIG. 1 and burst efficient fast program acquisition system 210 of FIG. 2) can decode 445 the fast burst 415 and truncate unneeded frames into a subset of pixel data frames 450. Subsequently, the burst efficient fast program acquisition system can encode 455 the pixel data 450 into a recoded streamlined bursts for fast program acquisition. The frames needed to recode in this example can include I-frame $I_0$, P-frame $P_3$, and P-frame $P_6$. B-frames can be omitted because of the B-frame's lack of predictive value. In some implementations, the last anchor frame before the join point can be decoded using I-frame $I_0$, P-frame $P_3$, and P-frame $P_6$. After the last anchor frame before the join point is decoded, that frame can be re-encoded as an I-frame ($I_6$). Frames that occur at or after the join point can reference the re-encoded I-frame for decoding purposes at the subscriber terminal. It should be understood that re-encoding $I_6$ is an intermediate solution.

In other implementations, the burst efficient fast program acquisition system can also recode GOP fast burst 460 to a lower resolution thereby reducing the needed bandwidth transmit the recoded fast burst 460. In some implementations, a subset of the fast burst frames can be transrated or recoded. It should be understood that recode burst efficient fast program acquisition can occur independently or in conjunction with other burst streamlining methods.

In still further implementations, recode streamlined fast bursts can be used in conjunction with program selection prediction methods. For example, recode streamlined fast bursts can be pre-calculated and stored for programs that are related in some way to the subscriber's current program. In another example, recode streamlined fast bursts can be pre-calculated and stored for programs that are frequently visited by a subscriber.

Figure 5:
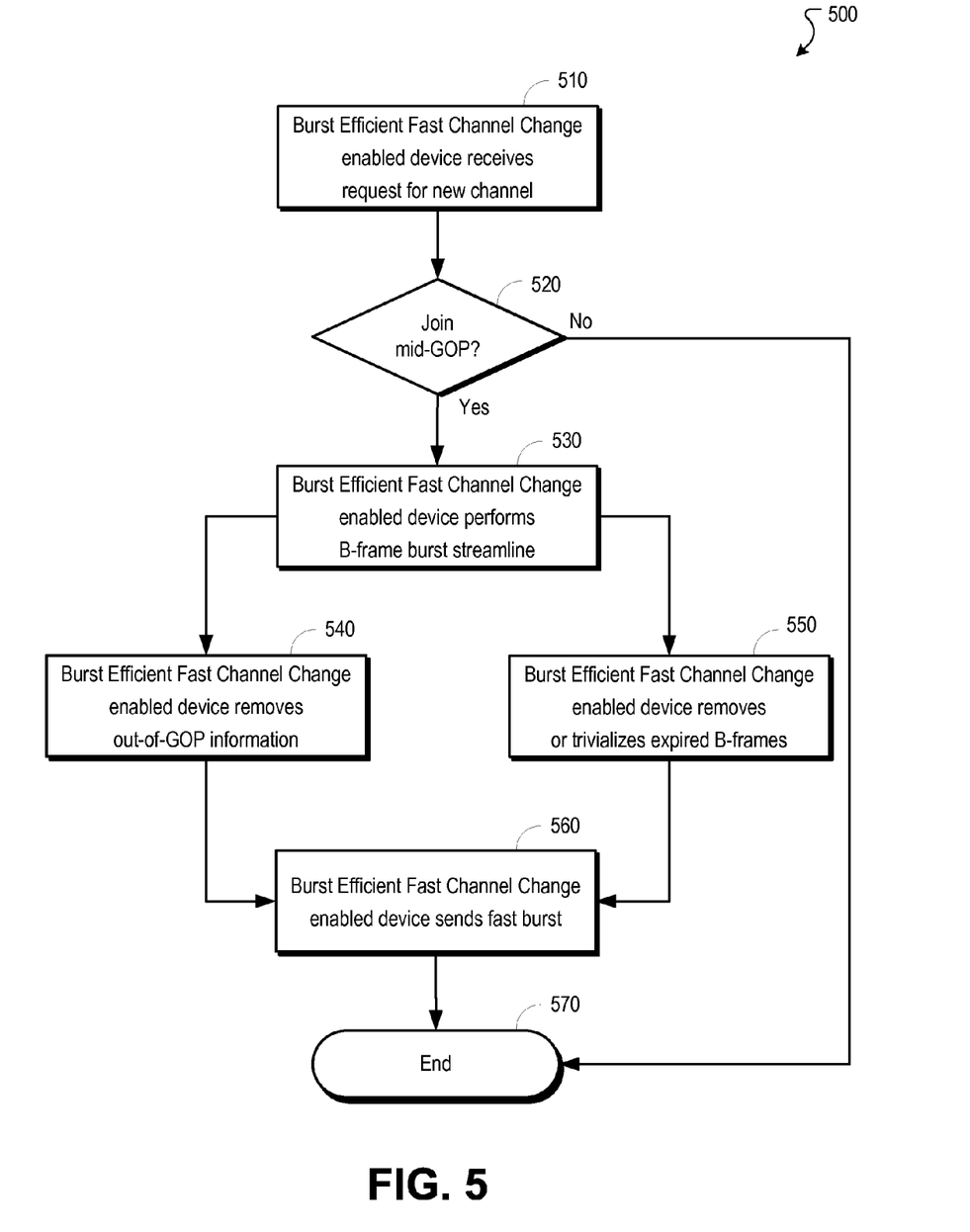
FIG. 5 is a flowchart illustrating an example process to provide B-frame burst streamlined fast program acquisition.

FIG. 5 is a flowchart illustrating an example process to provide B-frame burst streamlined fast program acquisition. This example process 500 begins at stage 510, where a burst efficient fast program acquisition system receives a request for a program acquisition from a subscriber. The request can occur from a subscriber (e.g., subscribers 120a-d of FIG. 1 and FIG. 2) to a burst efficient fast program acquisition system such as, for example, a headend (e.g., headend 110 of FIG. 1 and burst efficient fast program acquisition system 210 of FIG. 2).

At stage 520, a determination is made whether the program acquisition has occurred during transmission of a GOP. The determination can be made by the burst efficient fast program acquisition system (e.g., headend 110 of FIG. 1 and burst efficient fast program acquisition system 210 of FIG. 2). In some implementations, a streamlined fast burst can be generated prior to the determination to proceed with sending a fast burst. In other implementations, the fast burst can be generated and sent even on a GOP boundary.

If the program acquisition does not occur during a GOP transmission, then the process ends at stage 560. The subscriber (e.g., subscriber 120a-d of FIG. 1 and FIG. 2) can join at the beginning of the next I-frame GOP and thus eliminate the need to generate and send a fast burst.

If the program acquisition does occur far from a GOP boundary, then at stage 530, the burst efficient fast program acquisition system performs B-frame burst streamlining. The B-frame burst streamlining can be performed by the burst efficient fast program acquisition system (e.g., headend 110 of FIG. 1 and burst efficient fast program acquisition system 210 of FIG. 2). In some implementations, the burst efficient fast program acquisition system can remove unneeded B-frames from the fast burst. It should be understood that removal of B-frames can occur independently or in conjunction with other burst streamlining methods.

At stage 540, the burst efficient fast program acquisition system can remove unneeded and/or expired B-frames. The removal of unneeded B-frames (e.g., $B_{-2}$ 340 of FIG. 3) and/or expired B-frames (e.g., $B_2$ 360 of FIG. 3) can be performed by the burst efficient fast program acquisition system (e.g., headend 110 of FIG. 1 and burst efficient fast program acquisition system 210 of FIG. 2). In some implementations, the B-frames can be removed without replacement. In other implementations, the B-frames can be replaced with blank B-frames. In still further implementations, the B-frames can be replaced with trivial data. It should be understood that removal of unneeded B-frames can be performed independently or in conjunction with other streamlining methods.

At stage 550, the burst efficient fast program acquisition system can send the streamlined fast burst to the subscriber. The streamlined fast burst can be sent from the burst efficient fast program acquisition system (e.g., headend 110 of FIG. 1 and burst efficient fast program acquisition system 210 of FIG. 2) to the subscriber (e.g., subscriber 120a-d of FIG. 1 and FIG. 2). In some implementations, the fast burst can be transmitted as a unicast burst to the subscriber. In other implementations, fast bursts can be transmitted to multiple subscribers requesting a program acquisition. The process 500 ends at stage 570.

Figure 6:
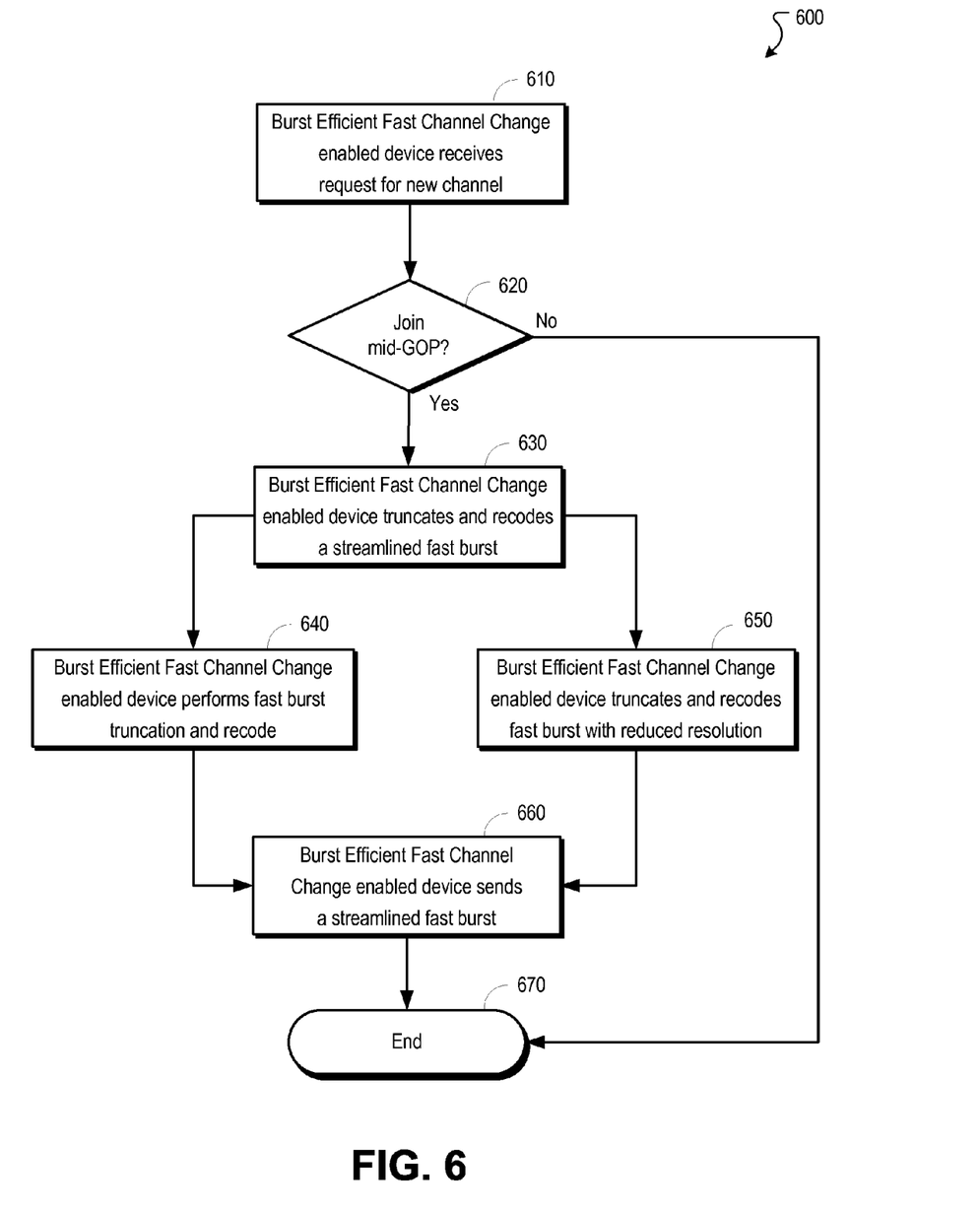
FIG. 6 is a flowchart illustrating an example process to provide a truncated and recoded burst streamlined fast program acquisition.

FIG. 6 is a flowchart illustrating an example process to provide a truncated and recoded burst streamlined fast program acquisition. This example process 600 begins at stage 610, where a burst efficient fast program acquisition system receives a request for a new program from a subscriber. The request can occur from a subscriber (e.g., subscribers 120a-d of FIG. 1 and FIG. 2) to a burst efficient fast program acquisition system such as, for example, a headend (e.g., headend 110 of FIG. 1 and burst efficient fast program acquisition system 210 of FIG. 2).

At stage 620, a determination is made whether the program acquisition has occurred far from a GOP boundary. The determination can be made by the burst efficient fast program acquisition system (e.g., headend 110 of FIG. 1 and burst efficient fast program acquisition system 210 of FIG. 2). In some implementations, a streamlined fast burst can be generated prior to the determination to proceed with streamlining. In other implementations, the fast burst can be generated and sent even on a GOP boundary.

If the program acquisition does not occur far from a GOP boundary, then the process ends at stage 670. The subscriber (e.g., subscriber 120a-d of FIG. 1 and FIG. 2) can join at the beginning of the next GOP and thus eliminate the need to generate and send a fast burst.

If the program acquisition does occur far from a GOP boundary, then at stage 630, the burst efficient fast program acquisition system performs recode burst streamlining. The recode burst streamlining can be performed by the burst efficient fast program acquisition system (e.g., headend 110 of FIG. 1 and burst efficient fast program acquisition system 210 of FIG. 2). In some implementations, the burst efficient fast program acquisition system can decode, truncate, and encode a streamlined fast burst. It should be understood that recode fast burst streamlining can occur independently or in conjunction with other burst streamlining methods such as, for example, B-frame burst streamlining.

At stage 640, the burst efficient fast program acquisition system can perform fast burst truncation and recode. The truncation and recode can be performed by the burst efficient fast program acquisition system (e.g., headend 110 of FIG. 1 and burst efficient fast program acquisition system 210 of FIG. 2). In some implementations, the burst efficient fast program acquisition system can decode the fast burst (e.g., decode 445 of FIG. 4), truncate the frames into the necessary pixel data (e.g., pixel data 450 of FIG. 4), and encode (e.g., encode 455 of FIG. 4) the new frames into a streamlined fast burst (e.g., fast burst 460 of FIG. 4). In other implementations, the burst efficient fast program acquisition system can recode a subset of the necessary frames used for subscriber GOP reconstruction. It should be understood that truncation and recode streamlining can be performed independently or in conjunction with removal of B-frames and/or other streamlining methods.

At stage 650, the burst efficient fast program acquisition system can perform fast burst truncation and recode with reduced resolution. The truncation and recode with reduced resolution can be performed by the burst efficient fast program acquisition system (e.g., headend 110 of FIG. 1 and burst efficient fast program acquisition system 210 of FIG. 2). In some implementations, the burst efficient fast program acquisition system can decode the fast burst (e.g., decode 445 of FIG. 4), truncate the frames into the necessary pixel data (e.g., pixel data 450 of FIG. 4), and encode (e.g., encode 455 of FIG. 4) the new frames into a reduced resolution streamlined fast burst (e.g., fast burst 460 of FIG. 4). In other implementations, the burst efficient fast program acquisition system can recode a subset of the necessary frames used for GOP video image reconstruction. It should be understood that truncation and recode streamlining with reduced resolution can be performed independently or in conjunction with removal of B-frames and/or other streamlining methods.

At stage 660, the burst efficient fast program acquisition system can send the streamlined fast burst to the subscriber. The streamlined fast burst can be sent from the burst efficient fast program acquisition system (e.g., headend 110 of FIG. 1 and burst efficient fast program acquisition system 210 of FIG. 2) to the subscriber (e.g., subscriber 120a-d of FIG. 1 and FIG. 2). In some implementations, the streamlined fast burst can be transmitted as a unicast burst to the subscriber. In other implementations, streamlined fast burst can be transmitted to multiple subscribers requesting a program acquisition. The process 600 ends at stage 670.

Figure 7:
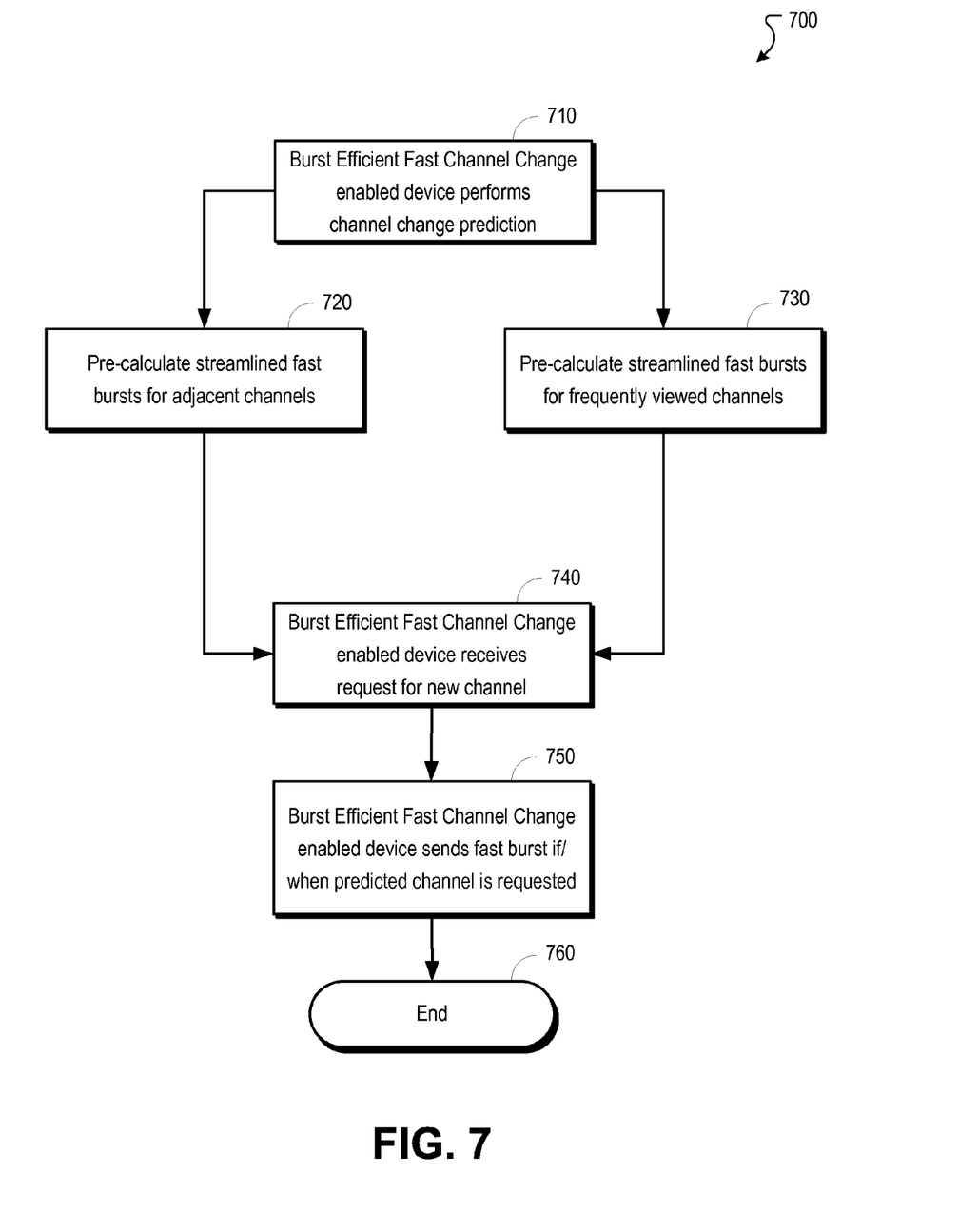
FIG. 7 is a flowchart illustrating an example process to provide program prediction burst efficient fast program acquisition.

FIG. 7 is a flowchart illustrating an example process to provide program selection prediction burst efficient fast program acquisition. This example process 700 begins at stage 710, where a burst efficient fast program acquisition system performs program selection prediction. The prediction can be performed at a fast program selection prediction module (e.g., fast program selection prediction module 250 of FIG. 2) in a burst efficient fast program acquisition system (e.g., headend 110 of FIG. 1 and burst efficient fast program acquisition system 210 of FIG. 2). In some implementations, the prediction can occur continuously as programmed by the service provider. In other implementations, the prediction frequency is based on current network conditions. In still further implementations, the prediction can be based on other threshold values such as, for example, the anticipated program acquisition latency.

At stage 720, the burst efficient fast program acquisition system can pre-calculate streamlined fast bursts of related programs. The related program prediction can be performed at a fast program selection prediction module (e.g., fast program selection prediction module 250 of FIG. 2) in a burst efficient fast program acquisition system (e.g., headend 110 of FIG. 1 and burst efficient fast program acquisition system 210 of FIG. 2) and include one or more streamlining methods such as, for example, B-frame streamlining (e.g., B-frame streamlining 550 and 560 of FIG. 5) and/or recode streamlining (e.g., recode streamlining 650 and 660 of FIG. 6). In some implementations, the number of related programs is a configurable value. In other implementations, the adjacent program prediction can pre-calculate one or more programs based on subscriber behavior and/or network conditions.

At stage 730, the burst efficient fast program acquisition system can pre-calculate burst streamlining for fast burst of frequently viewed programs. The frequently viewed program prediction can be performed at a fast program selection prediction module (e.g., fast program selection prediction module 250 of FIG. 2) in a burst efficient fast program acquisition system (e.g., headend 110 of FIG. 1 and burst efficient fast program acquisition system 210 of FIG. 2) and include one or more streamlining methods such as, for example, B-frame streamlining (e.g., B-frame streamlining 550 and 560 of FIG. 5) and/or recode streamlining (e.g., recode streamlining 650 and 660 of FIG. 6). In some implementations, the frequently viewed predicted programs is based on a table and/or list of most frequently viewed programs in a given time period. In other implementations, the frequently viewed program prediction can pre-calculate one or more programs based on monitoring subscriber behavior, other statistical methods, and/or network conditions.

At stage 740, the burst efficient fast program acquisition system receives a request for a new program from a subscriber. The request can occur from a subscriber (e.g., subscribers 120a-d of FIG. 1 and FIG. 2) to a burst efficient fast program acquisition system such as, for example, a headend (e.g., headend 110 of FIG. 1 and burst efficient fast program acquisition system 210 of FIG. 2). In various implementations, the headend can be a device or incorporated as a function in one or more of networked devices.

At stage 750, the burst efficient fast program acquisition system can send the fast burst to the subscriber if/when predicted program is requested. The streamlined fast burst can be sent from the burst efficient fast program acquisition system (e.g., headend 110 of FIG. 1 and burst efficient fast program acquisition system 210 of FIG. 2) to the subscriber (e.g., subscriber 120a-d of FIG. 1 and FIG. 2). In some implementations, the fast burst can be transmitted as a unicast burst to the subscriber. In other implementations, fast burst can be transmitted to multiple subscribers requesting the same program. The process 700 ends at stage 760.

Figure 8:
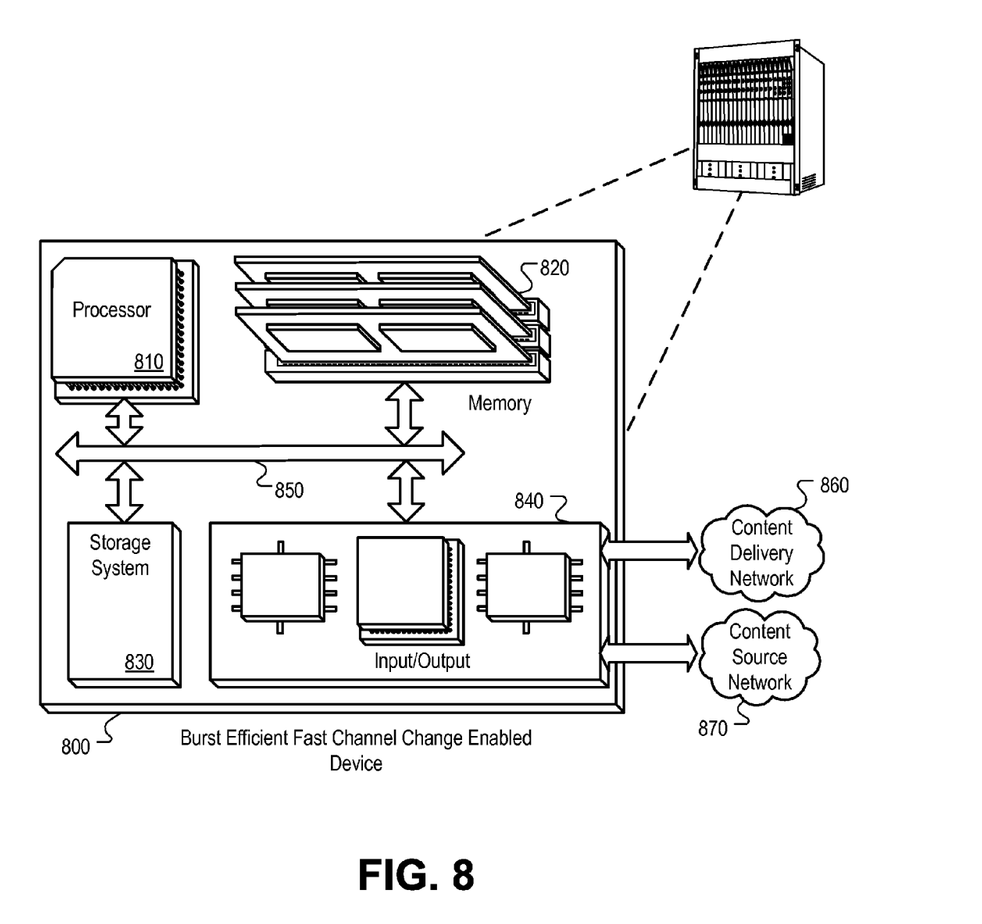
FIG. 8 is a component diagram of an example burst efficient fast program acquisition system.

FIG. 8 is a component diagram of an example burst efficient fast program acquisition system. The burst efficient fast program acquisition system 800 can include a processor 810, a memory 820, a storage device 830, and an input/output device 840. Each of the components 810, 820, 830, and 840 can be interconnected, for example, using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830.

The memory 820 stores information within the device 800. In one implementation, the memory 820 is a computer-readable medium. In one implementation, the memory 820 is a volatile memory unit. In another implementation, the memory 820 is a non-volatile memory unit.

In some implementations, the storage device 830 is capable of providing mass storage for the device 800. In one implementation, the storage device 830 is a computer-readable medium. In various different implementations, the storage device 830 can include, for example, a hard disk device, an optical disk device, flash memory or some other large capacity storage device.

The input/output device 840 provides input/output operations for the device 800. In one implementation, the input/output device 840 can interface to a content delivery network 860 or a content source network 870. In addition, such input/output device 840 can communicate with other external devices through various interfaces such as, for example, an IP network interface device, e.g., an Ethernet card, a cellular network interface, a serial communication device, e.g., and RS-232 port, and/or a wireless interface device, e.g., and 802.11 card. In another implementation, the input/output device can include driver devices configured to receive input data and send output data to other input/output devices (e.g., a content delivery network 860 and/or content source network 870), as well as sending communications to, and receiving communications from various networks (not shown).

The device of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a digital signal processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A burst efficient fast program acquisition system, comprising:
    a network interface operable to receive an incoming signal comprising a program selection request;
    a system processor coupled to the network interface, the system processor operable to generate a fast burst of a requested program comprising video frames to enable a user to view video images when the program selection request is made during a transmission of a group of pictures, the system processor being further operable to streamline the fast burst by identifying and removing only unused B-frames, the identifying and removing occurring based upon the system processor decoding the fast burst, truncating the fast burst to generate a truncated group of fast burst frames that does not include the unused B-frames, and recoding the truncated group of fast burst frames; and
    wherein the network interface is further operable to transmit a single B-frame burst streamlined fast burst, based on the recoding of the truncated group of fast burst frames.

2. The burst efficient fast program acquisition system of claim 1, wherein the removed B-frames are replaced with blank or trivial B-frames.

3. The burst efficient fast program acquisition system of claim 1, wherein the unused B-frames are identified as expired B-frames.

4. The burst efficient fast program acquisition system of claim 3, wherein the removed B-frames are replaced with blank B-frames.

5. The burst efficient fast program acquisition system of claim 3, wherein the removed B-frames are replaced with trivial B-frames.

6. A burst efficient fast program acquisition system, comprising:
    a network interface operable to receive an incoming signal comprising a program selection request;
    a system processor coupled to the network interface, the system processor operable to generate a fast burst of a requested program comprising video frames to enable a user to view video images when the program selection request is made during a transmission of a group of pictures, the system processor being further operable to streamline the fast burst by decoding the fast burst, truncating the fast burst, and recoding a truncated group of fast burst frames, the system processor being operable to truncate the fast burst by identifying unused B-frames and removing only the unused B-frames to generate the truncated group of fast burst frames; and
    wherein the network interface is further operable to transmit a single recoded burst streamlined fast burst, based on the recoding of the truncated group of fast burst frames, responsive to the program selection request.

7. The burst efficient fast program acquisition system of claim 6, wherein the truncated group includes pre join I-frames and P-frames from the group of pictures.

8. The burst efficient fast program acquisition system of claim 6, wherein the system processor encodes a truncated group with a lower video resolution.

9. The burst efficient fast program acquisition system of claim 7, wherein the system processor encodes a truncated group with a lower video resolution.

10. A computer implemented method comprising:
receiving, via a network interface coupled to a system processor, a program selection request;
generating, in one or more processors of the system processor, a fast burst;
streamlining, in the one or more processors, the fast burst with frame modification to produce a streamlined fast burst,
wherein the frame modification comprises identifying unused B-frames and removing only the unused B-frames from a group of pictures while leaving other B-frames, and further wherein the identifying and removing steps performed in the one or more processors comprise decoding the fast burst, truncating the fast burst to generate a truncated group of fast burst frames that does not include the unused B-frames, and recoding the truncated group of fast burst frames; and
transmitting, by a unicast transmission via the network interface, a single B-frame burst streamlined fast burst, based on the recoding of the truncated group of fast burst frames, to a user for reconstruction of a group of pictures.

11. The computer implemented method of claim 10, wherein the frame modification is removal of unused B-frames.

12. The computer implemented method of claim 11, further comprising replacing removed B-frames with trivial B-frames.

13. The computer implemented method of claim 11, further comprising replacing removed B-frames with blank B-frames.

14. The computer implemented method of claim 10, wherein the frame modification is decoding the fast burst frames and encoding a truncated group of frames.

15. The computer implemented method of claim 14, further comprising encoding the truncated group of frames at a lower frame resolution.

16. A computer implemented method comprising:
predicting, in a system processor, a program selection request;
generating, in the system processor, a fast burst;
streamlining, in the system processor, the fast burst with frame modification to produce a streamlined fast burst, the frame modification including decoding a group of pictures, truncating the group of pictures to generate a truncated group of pictures based on the decoded group of pictures, and recoding the truncated group of pictures, the system processor being operable to truncate the group of pictures by identifying unused B-frames and removing only the unused B-frames to generate the truncated group of pictures; and
transmitting a single recoded burst streamlined fast burst, based on the recoding of the truncated group of pictures, to a user in a unicast stream for reconstruction of a group of pictures after a predicted program selection.

17. The computer implemented method of claim 16, wherein the prediction is based on related programs from a current program viewed by the user.

18. The computer implemented method of claim 17, wherein the frame modification is removal of unused B-frames.

19. The computer implemented method of claim 17, wherein the frame modification is decoding the fast burst frames and encoding a truncated group of frames.

20. The computer implemented method of claim 16, wherein the prediction is based on frequently viewed programs by the user.

21. The computer implemented method of claim 20, wherein the frame modification is removal of unused B-frames.

22. The computer implemented method of claim 20, wherein the frame modification is decoding the fast burst frames and encoding a truncated group of frames.

* * * * *